US006947470B2

(12) United States Patent
Berens

(10) Patent No.: US 6,947,470 B2
(45) Date of Patent: Sep. 20, 2005

(54) RAKE RECEIVER FOR A CDMA SYSTEM, IN PARTICULAR INCORPORATED IN A CELLULAR MOBILE PHONE

(75) Inventor: Friedbert Berens, Geneva (CH)

(73) Assignee: STMicroelectronics N.V., Amsterdam (NL)

( * ) Notice: Subject to any disclaimer, the term of this patent is extended or adjusted under 35 U.S.C. 154(b) by 807 days.

(21) Appl. No.: 09/907,086

(22) Filed: Jul. 17, 2001

(65) Prior Publication Data

US 2002/0012384 A1 Jan. 31, 2002

(30) Foreign Application Priority Data

Jul. 21, 2000 (EP) ........................................... 00114996

(51) Int. Cl.[7] ................................................ H04B 1/707
(52) U.S. Cl. ........................ 375/144; 375/148; 370/342
(58) Field of Search ................................ 375/130, 140, 375/141, 142, 143, 144, 145, 147, 148, 100, 102, 316, 340, 346, 347; 370/208, 209, 320, 335, 342, 441

(56) References Cited

U.S. PATENT DOCUMENTS 5,361,276 A * 11/1994 Subramanian ............. 375/150
5,675,616 A * 10/1997 Hulbert et al. ............. 375/355
5,764,687 A 6/1998 Easton ....................... 375/206
5,764,688 A 6/1998 Hulbert et al. ............. 375/206
5,999,562 A * 12/1999 Hennedy et al. ............ 375/152
6,779,009 B1 * 8/2004 Zuber ......................... 708/422
2002/0176393 A1 * 11/2002 Maruyama .................. 370/342

FOREIGN PATENT DOCUMENTS

EP 0851600 7/1998 ........... H04B/1/707

* cited by examiner

*Primary Examiner*—Chieh M. Fan
(74) *Attorney, Agent, or Firm*—Lisa K. Jorgenson; Allen, Dyer, Doppelt, Milbrath & Gilchrist, P.A.

(57) ABSTRACT

A rake receiver uses a delayed version of the received sequence and a delayed version of a scrambling code. The flexible hardware structure of the time-aligning and descrambling unit includes at least two delay chains and one multiplier. By controlling two multiplexers, the delayed versions of the received sequence can be multiplied with an arbitrary scrambling code having an arbitrary phase. During one chip period, one multiplication is performed for each path to be processed.

39 Claims, 7 Drawing Sheets

RAKE RECEIVER FOR A CDMA SYSTEM, IN PARTICULAR INCORPORATED IN A CELLULAR MOBILE PHONE

FIELD OF THE INVENTION

The present invention relates to the field of wireless communication systems, and more particularly, to CDMA systems such as the different CDMA based mobile radio systems including CDMA 2000, Wide Band CDMA, and the IS-95 standard.

BACKGROUND OF THE INVENTION

In a wireless communication system, a central base station communicates with a plurality of remote terminals, such as cellular mobile phones. Frequency-Division Multiple Access (FDMA) and Time-Division Multiple Access (TDMA) are the traditional multiple access schemes to provide simultaneous services to a number of terminals. The basic idea behind FDMA and TDMA technics is to slice the available resource into multiple frequency or time slots, respectively, so that multiple terminals can be accommodated without causing interference.

Contrasting these schemes with separate signals in frequency or time domains, Code-Division Multiple Access (CDMA) allows multiple users to share a common frequency and time channel by using coded modulation.

More precisely, a scrambling code, which is a long pseudo noise code sequence, is associated with each base station and permits the base stations to be distinguished from each other, as is well known by one skilled in the art. Further, an orthogonal code referred to as an OVSF code, is allocated to each remote terminal, such as a cellular mobile phone, as also well known by one skilled in the art. All these OVSF codes are orthogonal with each other, which permits a remote terminal to be distinguished from one another.

Before emitting a signal on the transmission channel towards a remote terminal, the signal has been scrambled and spread by the base station using the scrambling code of the base station and the OVSF code of the remote terminal.

Because of possible reflections of the initial transmitted signal on obstacles between the base station and the remote terminal, the transmission channel is actually a multipath transmission channel. As a result, the signal received by a remote terminal includes different time shifted versions of the initial transmitted signal which is based upon the multipath transmission characteristics of the mobile radio channel. Each path introduces a different time delay.

A remote terminal, which operates in a CDMA communication system, comprises a so-called "rake receiver". A rake receiver is adapted for time aligning, descrambling, despreading, and combining the delayed versions of the initial signals to deliver the data stream contained in the initial signal. The terminology "N-finger" indicates that the maximum number of paths that can be combined in such a receiver is N.

After having been processed by a front end radio frequency stage, and converted in an analog-to-digital converter, the received signal is formed by a succession of chips oversampled with a predetermined oversampling factor, thus forming an input sequence of samples.

One known approach for implementing the time aligning and descrambling operations includes storing the input sequence of samples in a delay chain having a length determined by the maximum delay spread of the multipath channel. The maximum delay spread is determined for the worst case. Then, for each path of the channel, one of the outputs of the delay chain is selected, depending on the delay value of the path. The selected output signal is then multiplied by the scrambling code of the base station.

However, such an approach is hardware consuming since one multiplier is implemented for each path. Further, a large amount of input memory is needed since it is necessary to take into account the maximum delay spread in the worst case together with the resolution of the analog-to-digital converters.

Another approach uses, for each path, a delayed version of the scrambling code of the base station. According to this approach, it is necessary to either implement a different scrambling code generator for each path, or to use a memory storing all the delayed scrambling codes for all the paths. However, it is difficult to implement independent scrambling code generators for each of the fingers. If a memory is used for storing all the delayed scrambling codes for all the paths, the addressing scheme of this memory is rather complicated and furthermore, must be modified, if during the transmission, one delay value of one path changes. The implementation of this approach is even more complicated when several scrambling codes associated with several base stations must be taken into account in the rake receiver.

SUMMARY OF THE INVENTION

In view of the foregoing background, it is an object of the present invention to overcome the above described problems.

Another object of the present invention is to provide a rake receiver with a time aligning and descrambling unit having a rather straightforward and flexible hardware structure.

These and other objects, features and advantages are provided by a digital N-finger rake receiver for a CDMA system comprising input means for receiving a digital scrambled and spread signal formed by chips or pulses having a duration Tc, oversampled with an oversampling factor Ns and including delayed versions of at least one initial signal scrambled with at least one scrambling code spread with at least one orthogonal code, and transmitted by at least one emitter on a multipath transmission channel having a predetermined maximum delay spread Ds.

The rake receiver further comprises estimation means connected to the input means for estimating the number of paths of the channel and their different time delay values, which are theoretically respectively equal to multiples of Tc/Ns, and processing means for time-aligning, descrambling, despreading, combining the delay versions and delivering the data stream contained in the initial signal.

According to a general feature of the present invention, the processing means comprises a time aligning and descrambling unit including a first delay chain connected to the input means and having N1 first outputs, with N1 being equal to at least Ns+1. The delay value between two adjacent first inputs is equal to Tc/Ns. A phase controllable scrambling code generator generates the scrambling code of the initial signal. A second delay chain is connected to the output of the scrambling code generator and has 1+Ds/Tc second outputs. The delay value between two adjacent second outputs is equal to Tc.

The processing means further comprises first controllable selection means for selecting, for each path, one of the first outputs in response to a first control signal, and second controllable selection means for selecting, for each path, one of the second outputs in response to a second control signal. An output module includes main multiplication means for multiplying, for each path, the elementary signal present at the selected first output with the elementary signal present at the selected second output. Control means successively delivers the first and second control signals for each path according to the time delay value of the considered path.

With such an implementation according to the present invention, the stored samples of the received signal, which are stored in the first delay chain, are used for the fine timing adjustment of the descrambling unit. Since the minimum number of first outputs is equal to Ns+1, the memory size of the delay chain can be considerably reduced.

The oversampling factor Ns can be directly the oversampling factor of the A/D converters. However, if the oversampling factor of the A/D converters is not considered as being enough, the samples delivered by the A/D converters can be interpolated to obtain a greater number of samples. In such a case, the oversampling factor Ns is considered as being the final oversampling factor after interpolation.

Further, even if the length of the second delay chain depends on the maximum delay spread, the delay value between two adjacent second outputs is equal to Tc and not to Tc/Ns, which leads to a length less important than a length of a first delay chain which would be calculated on the basis of the maximum delay spread as in the prior art.

Further, because the scrambling codes are generally composed of BPSK codes which can be defined by only one bit, the memory size of the elements forming this second delay chain can be reduced. Each of the elements may be formed, for example, by a one bit flip-flop. In fact, the elements may be formed by a two bit flip-flop for taking into account the I stream and the Q stream. The size of the shift register forming the second delay chain is thus smaller than the size of the shift register forming the first delay chain, which depends on the resolution of the analog-to-digital converters.

According to the present invention, by controlling the two selection means (which can be formed by multiplexers), the delayed versions of the received signal may be multiplied with an arbitrary scrambling code having an arbitrary phase. During one chip period for each path to be processed, only one multiplication is performed which can be implemented, for example, by only one multiplier.

Since the scrambling code generator is phase controllable, it is possible to flexibly adapt the receiver time window to the variable delay spread. The phase of the generator may be delayed or enhanced by controlling the input clock of the generator, for example. Although the number N1 can be equal to Ns+1, it is preferably equal to at least 2Ns+1 which permits also a flexible fine timing adjustment of the descrambling unit to take into account, for example, negative delay values which can occur during the transmission.

According to an embodiment of the present invention, which contributes to obtaining the flexible adaptation of the receiver time window, the control means determines the difference between the greatest time delay value and the smallest time delay value among all the time delay values of the paths. The path associated with the smallest time delay value is considered as a reference path. The control means are thus adapted to select for this reference path, one specific first output of the first chain and one specific second output of the second chain. This depends on the difference, for example, if the first and second specific outputs can be located near the middle of the first and second delay chains. The other selected first and second outputs associated to the other paths are determined in relation to the first and second specific outputs.

In such a case, if during the transmission, a new delay value becomes smaller than the smallest delay value, one of the outputs located before the first or second specific outputs can be selected for this new delay value. Such a new delay value can be thus considered as being a negative relative delay value with respect to the delay value of the reference path.

According to another embodiment of the present invention, the first delay chain is a chain composed of (N1−1) first delay elements, each of which has an elementary delay value of Tc/Ns, and is clocked by a first clock signal having a period of Tc/Ns. The second delay chain may also be a chain composed of Ds/Tc second delay elements, each of which has an elementary delay value of Tc, and clocked by a second clock signal having a period of Tc.

According to yet another embodiment of the present invention, in which the multiplication performed during one chip period for each path to be processed, is implemented with only one multiplier. The control means are adapted to respectively successively deliver the first and second control signals associated to the corresponding paths at a frequency of N/Tc.

Further, the first controllable selection means comprises a first register connected to the first outputs of the first delay chain and clocked with a first register clock signal having a period of Tc. A first multiplexer is connected between the first register and one output of the main multiplication means, and is successively controlled by the first control signals.

By analogy, the second controllable selection means comprises a second register connected to the second outputs of the second delay chain and is clocked with a second register clock signal having a period of Tc. A second multiplexer is connected between the second register and another input of the main multiplication means, and is successively controlled by the second control signals.

The main multiplication means comprises a single multiplier, and the output module further comprises a demultiplexer connected to the output of the main multiplication means having N outputs, and being controlled by a demultiplexer control signal at a frequency of N/Tc. However, for lower speed requirements of the main multiplication means, several multipliers may be implemented in parallel.

More precisely, according to such a lower speed embodiment, the control means are adapted to respectively deliver the first and second control signals associated to the corresponding paths at a frequency N/MTc, and the main multiplication means comprises M parallel multipliers. The output module further comprises a demultiplexer connected to the output of the main multiplication means having N outputs, and is controlled by demultiplexer control signal at a frequency of N/MTc.

In a CDMA system, the received signal may include delayed versions of different initial signals respectively scrambled with different scrambling codes respectively associated with different emitters. In such a case, according to an embodiment of the present invention, the time-aligning and descrambling unit comprises different scrambling code generators, and different second delay chains, respectively receiving the different scrambling codes. Each second delay chain has 1+Ds/Tc second outputs and a delay value between two adjacent second outputs equal to Tc.

According to another embodiment of the present invention, the estimation means are further adapted to estimate the impulse response of each path. The processing means further comprise a despreading and combining unit connected to the output module of the time aligning and descrambling unit and to the estimation means. The despreading and combining units comprise storage means for storing the orthogonal code, and supplementary multiplication means connected to the main multiplication means and adapted for multiplying the signals delivered by the output module of the time aligning and descrambling unit with the orthogonal code.

Another aspect of the present invention is a digital information receiver device, in particular, a cellular mobile phone incorporating a rake receiver as defined above.

BRIEF DESCRIPTION OF THE DRAWINGS

Other advantages and features of the present invention will appear on examining the detailed description of embodiments, these being in no way limiting, and of the appended drawings, in which.

DETAILED DESCRIPTION OF THE PREFERRED EMBODIMENTS

Figure 1:
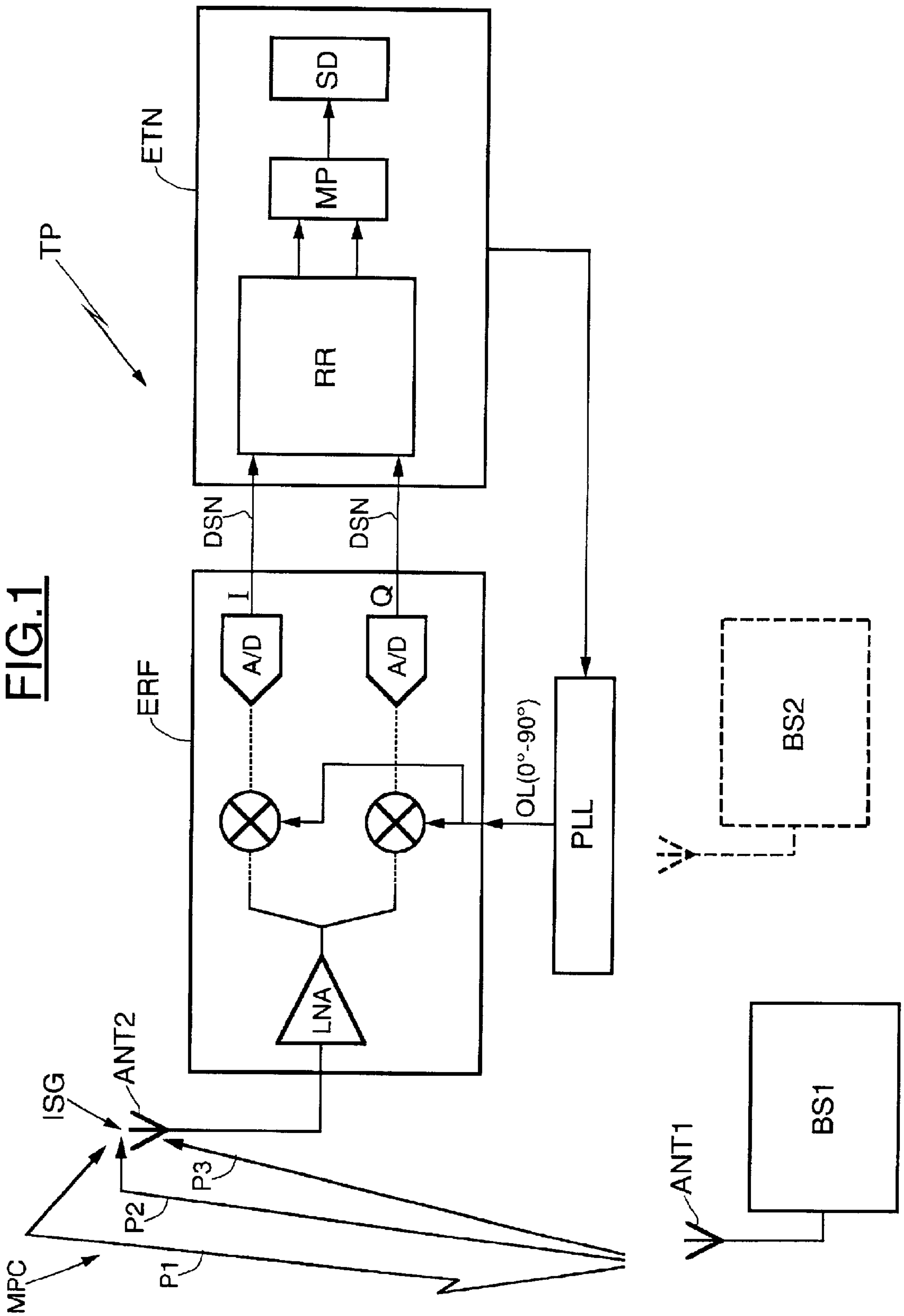
FIG. 1 is a block diagram illustrating a cellular mobile phone incorporating a Rake receiver according to the present invention.

In FIG. 1, the reference TP denotes a remote terminal such as a cellular mobile phone communicating with a base station BS1. The mobile phone TP comprises, conventionally, an analog radio frequency front end stage ERF connected to an antenna ANT2 for receiving an input signal ISG.

Conventionally, the stage ERF comprises a low noise amplifier LNA and two processing channels including mixers and conventional filters and amplifiers (not shown). The two mixers receive respectively from a phase locked loop PLL two signals, having mutually a phase difference of 90°. After frequency transposition in the mixers, the two processing channels define respectively two streams I and Q as readily understood by one skilled in the art. After digital conversion by analog-to-digital converters A/D, the two digital streams I and Q are delivered to a digital processing stage ETN.

The digital processing stage ETN comprises a rake receiver RR followed by conventional demapping means MP (demodulation means) which perform the demodulation of the signals delivered by the rake receiver. The stage ETN comprises also conventionally a source decoder SD which performs a source decoding, which is also well known by one skilled in the art. As also well known by one skilled in the art, the phase locked loop PLL is controlled by an automatic frequency control algorithm incorporated in a processor of the digital stage ETN.

The received signal ISG results from the transmission of an initial signal by the antenna ANT1 of the base station BS1 on a multipath channel transmission MPC. In the present embodiment, it is assumed that the mobile phone TP receives a signal from base station BS1 only. Of course, the received signal ISG could also result from the transmission of initial signals respectively emitted by several different base stations BS1 and BS2. Because of possible reflections of the signal on obstacles located between the base station BS1 and the mobile phone TP, the transmission channel MPC comprises several different transmission paths, here three paths P1, P2, P3 are shown.

As is also well known by one skilled in the art, before transmission through the antenna ANT1, the initial signal containing the data (symbols) is scrambled and spread by the processing means of the base station BS1. This is done by using the scrambling code of the base station and the orthogonal code (OVSF code) of the phone TP. Consequently, the symbols are transformed into chips having a predetermined length Tc, for example, equal to 260 ns, corresponding to a predetermined chip rate of 3.84 Mcps, for example. The chip rate is greater than the data or symbol rate. For example, one symbol may be transformed into 4 to 256 chips.

The initial signal formed of chips is then filtered in a matched filter before analog conversion and transmission through antenna ANT1. After analog-to-digital conversion in the A/D converters of the phone TP, the signal, i.e., a complex signal formed by the two streams I and Q, is a digital scrambled and spread signal formed of chips, oversampled with an oversampling factor Ns, for example, Ns=4. This digital signal DSN includes delayed versions of the initial scrambled and spread signal transmitted by the base station. Each path introduces a different time delay $\tau_1, \tau_2, \tau_3$.

Figure 2:
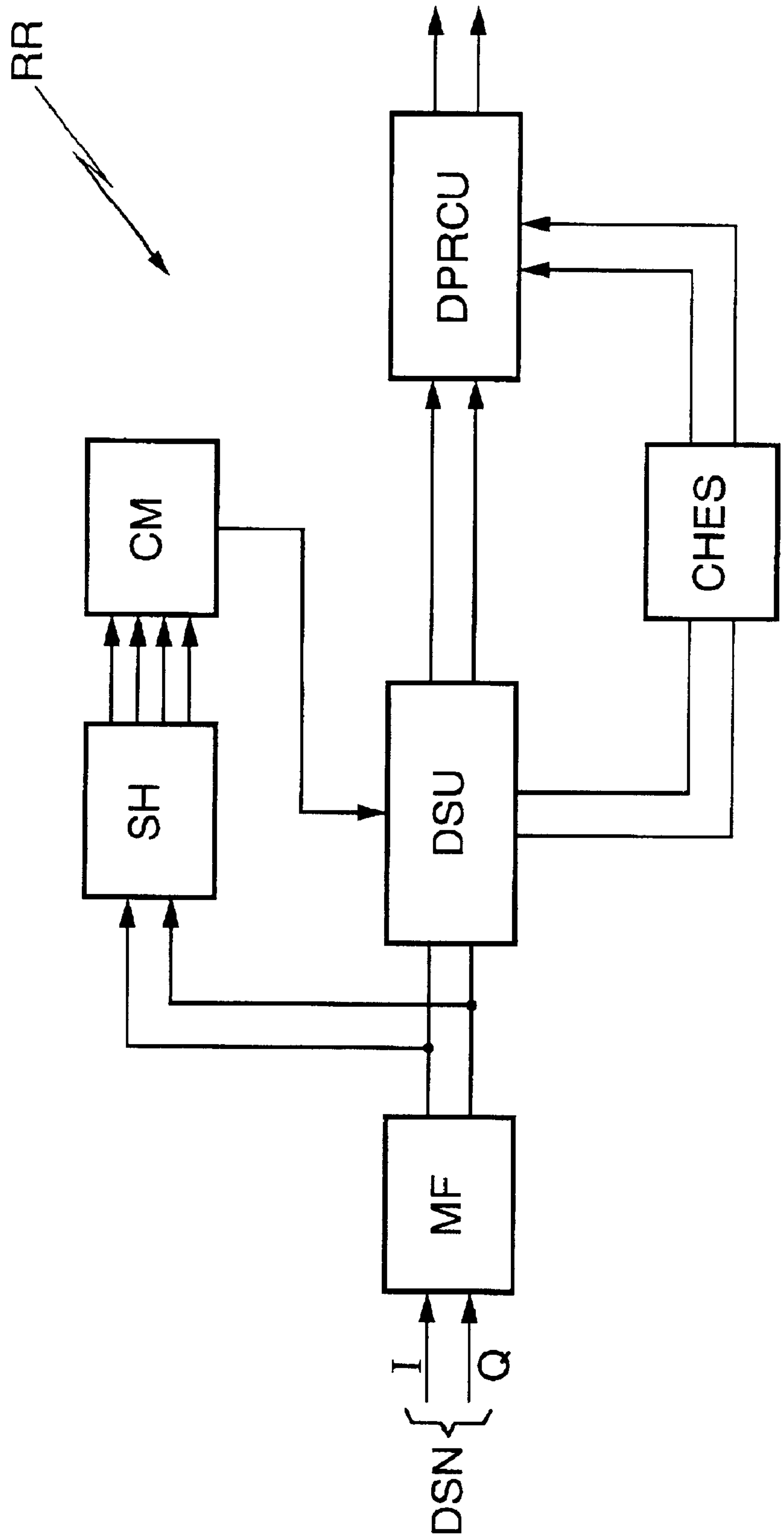
FIG. 2 is a block diagram illustrating the rake receiver according to the present invention.

Referring now to FIG. 2, the rake receiver RR comprises input means for receiving the digital signal DSN. The input means comprises, in particular, a matched filter MF. The time delays $\tau_i$ of the different paths of the multipath channel are estimated by a searcher SH and can be tracked by a tracking unit, such as a digital locked loop, for example. The structure of the searcher and the tracking unit are well known by one skilled in the art. Multipath arrivals at the searcher present themselves as correlation peaks occurring at different times. A peak's magnitude is proportional to the envelope of the path signal, and the time of each peak, relative to the first arrival, gives a measurement of the path's delay. The delays information delivered by the searcher is passed to a rake receiver management unit or control means CM.

The rake receiver RR also comprises a time aligning and descrambling unit DSU connected to the output of the matched filter MF. A despreading and combining unit DPRCU is connected to the output of the DSU unit as well as to the output of a channel estimator CHES, which estimates for each path its corresponding impulse response. The structure and the operation of such a channel estimator are also well-known by one skilled in the art.

Figure 3:
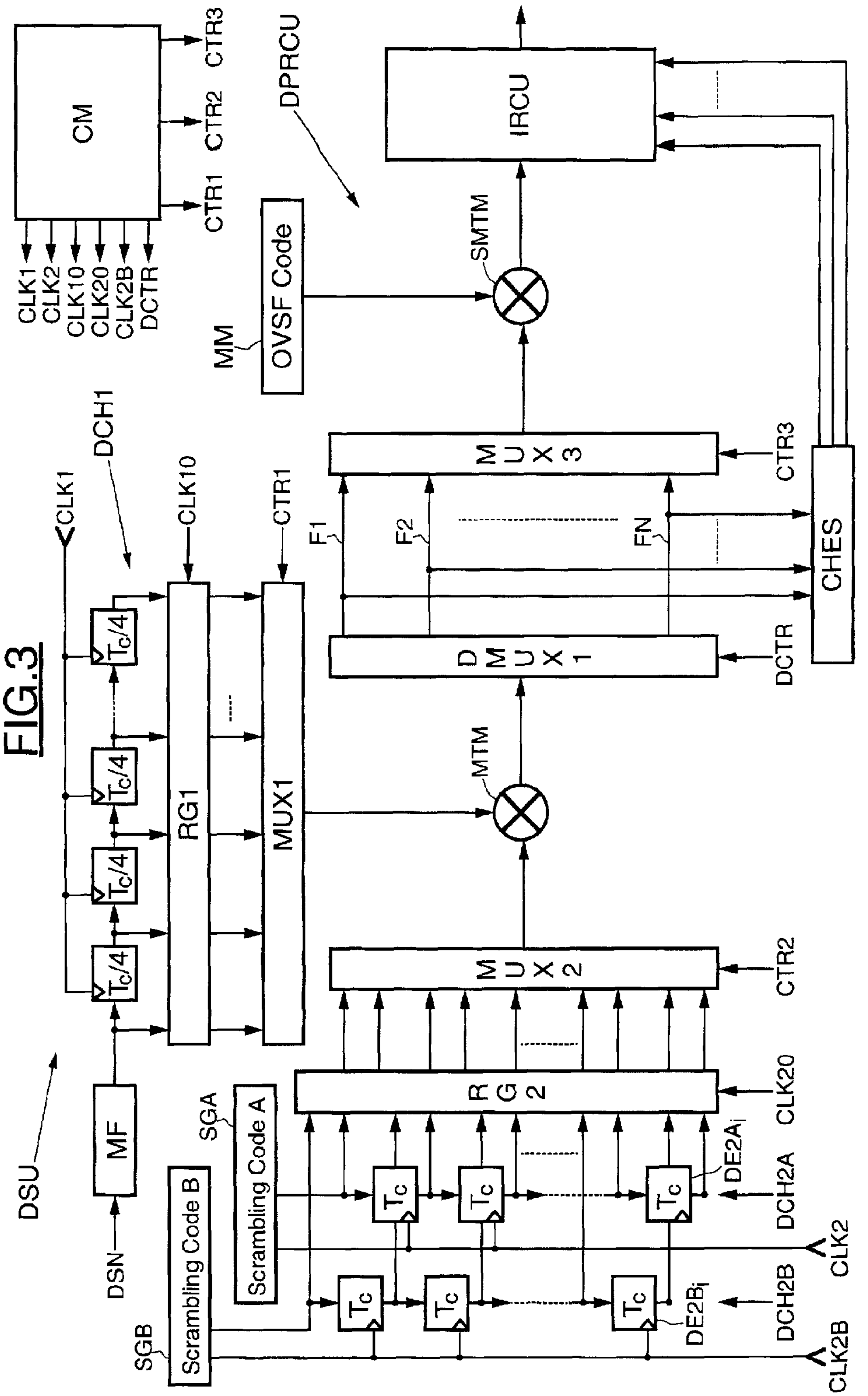
FIG. 3 is a detailed block diagram illustrating one embodiment of an internal structure of the rake receiver illustrated in FIG. 2.

Referring now to FIG. 3, the time-aligning and descrambling unit DSU comprises a first delay chain DCH1 connected to the output of the matched filter MF. This first delay chain DCH1 is composed of Ns first delay elements DE$1_i$, each of which has an elementary delay value of Tc/Ns, and are clocked by a first clock signal CLK1 having a period of Tc/Ns. Each first delay element can be, for example, a flip-flop clocked by the signal CLK1. It would be also possible to form the first delay chain by a shift register or a FIFO memory clocked by the signal CLK1.

In FIG. 3, the arrows are in fact double arrows for taking into account the two streams I and Q. For that reason, the multiplication means, which will be described in detail below, are complex multiplication means. However, for simplifying the discussion herein, the description of the structure and the operation thereof will be made considering in general one stream.

The minimum number of first delay elements $DE1_1$ is Ns, but is preferably at least 2Ns. For example, for an oversampling factor Ns equal to 4, the number of element $DE1_1$ should be around 10, and the size of each delay element $DE1_i$ is twice the resolution of the A/D convertor (two because of the two streams I and Q). The first clock signal CLK1 may be the sampling clock of the A/D convertors.

The respective inputs and outputs of the first delay elements $DE1_i$ are connected to a first register RG1 which is clocked with the first register clock signal CLK10 having a period of Tc. In other words, the clock rate of signal CLK10 is the chip rate. The outputs of the first register RG1 are connected to the inputs of a first multiplexer MUX1 which is controlled by successive first control signals CTR1. In this embodiment, since the main multiplication means MTM comprises only one complex multiplier, the control means CM respectively successively delivers the first control signals CTR1 which are associated to the corresponding paths at a frequency N/Tc, where N is a number of fingers of the rake receiver. In other words, the switching rate of multiplexer MUX1 is the chip rate divided by N.

The time-aligning and descrambling unit DSU further comprises a second delay chain DCH2A, which is connected to the output of a scrambling code generator SGA. The DSU unit may comprise several second delay chains respectively associated with several scrambling code generators, each of which is able to generate the scrambling code respectively associated with the several base stations capable of cooperating with the mobile phone. In FIG. 3, only two second delay chains DCH2A and DCH2B are represented and are connected to two scrambling code generators SGA and SGB.

For purposes of simplifying the discussion, the structure and the operation of only one scrambling code generator and the corresponding second delay chain will be described. The structure and the operation of the other scrambling code generators and corresponding second delay chains are the same.

The length of the second delay chain DCH2A is defined by the maximum delay spread Ds of the multipath transmission channel. This maximum delay spread is predetermined and corresponds generally to the greatest possible time delay value of the multipath channel. Such a delay spread may be equal, for example, to 10 microseconds. This maximum delay spread Ds defines also the length of the output sequence of the scrambling code generated by the scrambling code generator.

The delay value between two adjacent outputs of the second delay chain is equal to Tc and the second delay chain is provided with (1+DsTc) outputs. In the present embodiment, the delay chain DCH2A is composed of Ds/Tc second delay elements $DE2A_1$, each of which has an elementary delay value of Tc, and is clocked by a second clock signal CLK2 having a period of Tc. For example, by analogy with the first delay chain DCH1, each second delay element $DE2A_1$ may be a flip-flop clocked by the second clock signal CLK2 having the period of Tc. This second clock signal CLK2 clocks also the corresponding scrambling code generator SGA.

Figure 4A:
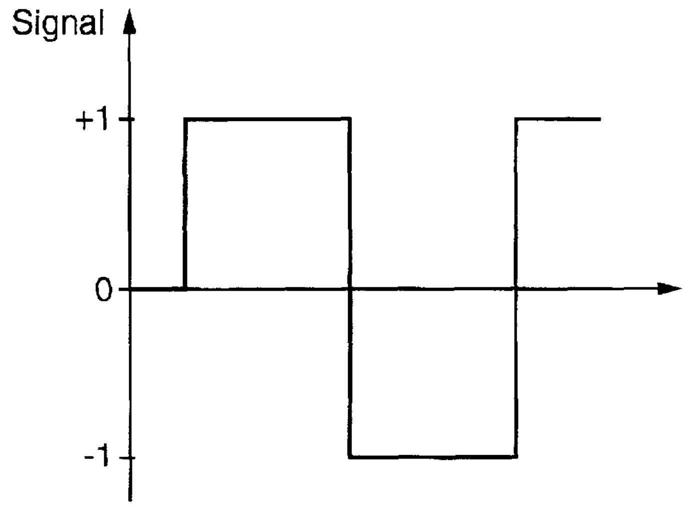
FIGS. 4*a*–4*c* are plots illustrating an example of a scrambling code and a corresponding scrambled signal.
Figure 4B:
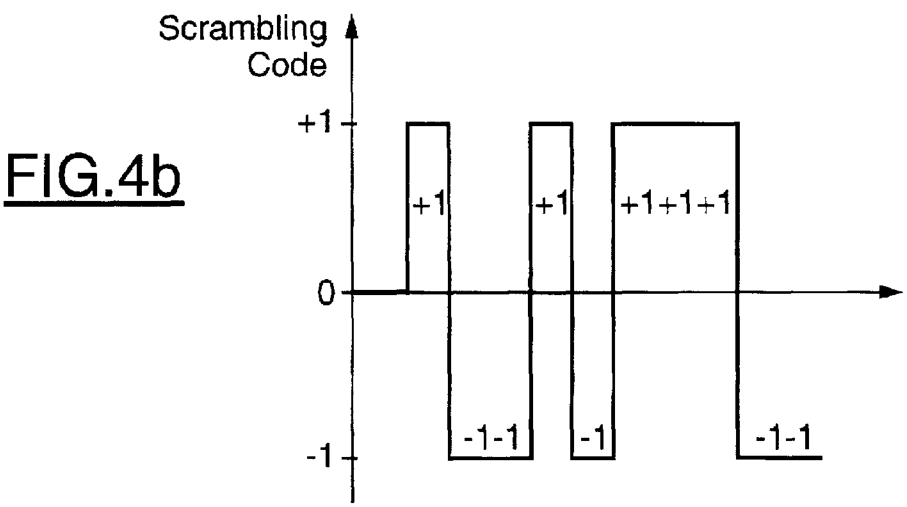
Figure 4C:
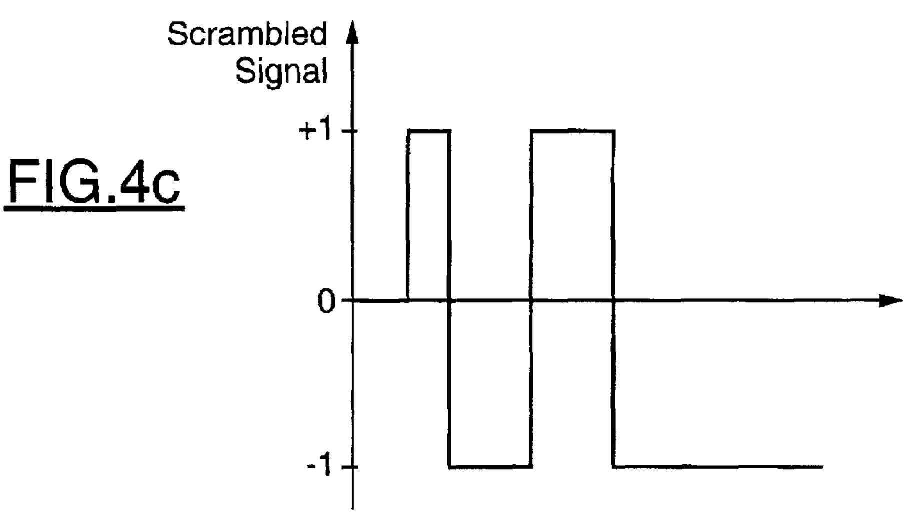

As illustrated in FIG. 4*b*, a scrambling code is, for example, a BPSK code which can be defined by only one bit. With such a scrambling code, the scrambled signal (descrambled signal) obtained by multiplying the scrambling code with the initial signal (scrambled signal) illustrated in FIG. 4*a* is illustrated in FIG. 4*c*. Since the scrambling code can be defined by only one bit, the size of each of second delay element $DE2A_i$ is only one bit. The scrambling code may in fact be two bits for taking into account the two streams I and Q.

Figure 5:
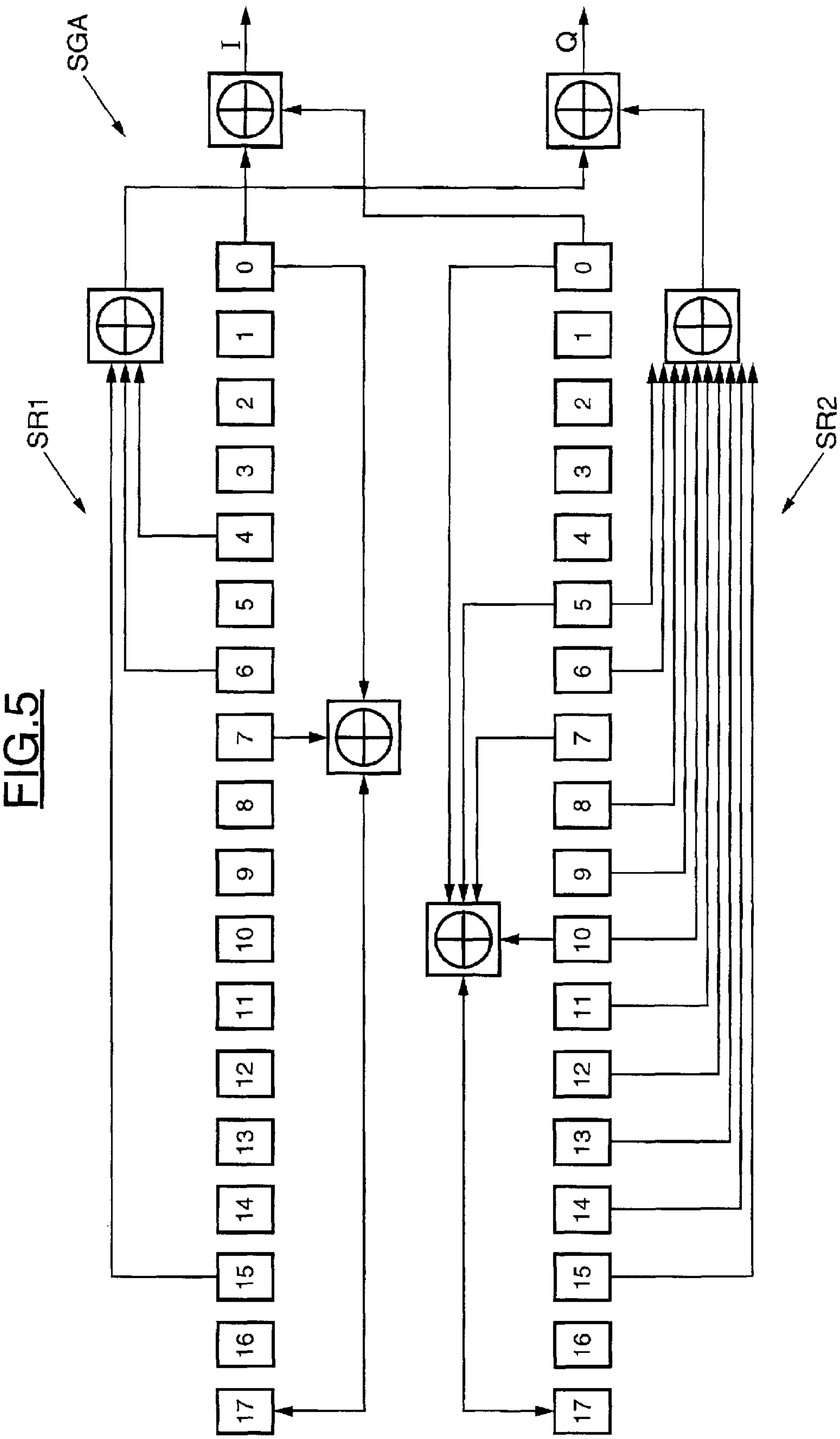
FIG. 5 is a block diagram illustrating one embodiment of a scrambling code generator implemented in a rake receiver according to the present invention.

An embodiment of a scrambling code generator is illustrated in more detail in FIG. 5. In this figure, a generator SGA comprises two parallel shift registers SR1 and SR2 having feedback loops included and respectively clocked by the second clock signal CLK2.

Such a generator SGA can generate several scrambling code sequences identified respectively by a scrambling code number n. The scrambling code sequences are formed by combining two real sequences into a complex sequence. Each of the two real sequences are formed as the position wise modulo 2 sum of 38400 chip segments of two binary m-sequences generated by two generator polynomials of degree 18. The resulting sequences thus form segments of a set of Gold sequences. The scrambling codes are repeated for every 10 ms radio frame. Let x and y be the two sequences respectively. The x sequence is constructed using the polynomial $1+X^7+X^{18}$. The y sequence is constructed by using the polynomial $1+X^5+X^7+X^{10}+X^{18}$. The sequence depending on the chosen scrambling code number n is denoted $z_n$. Furthermore, let x(i), y(i) and $z_n(i)$ denote the i:th symbol of the sequence x, y and $z_n$ respectively. The m-sequences x and y are constructed as follows:

Initial conditions:

$$x \text{ is constructed with } x(0)=1 \text{ and } x(1)=x(2)= \ldots =x(17)=0$$

$$y(0)=y(1)= \ldots =y(17)=1$$

Recursive definition of subsequent symbols:

$$x(i+18)=x(i+7)+x(i) \text{ modulo } 2,\ i=0, \ldots , 2^{18}-20.$$

$$y(i+18)=y(i+10)+y(i+7)+y(i+5)+y(i) \text{ modulo } 2,\ i=0, \ldots , 2^{18}-20.$$

The n:th Gold code sequence $z_n$, n=0, 1 . . . , $2^{18}-2$, is then defined as follows:

$$z_n(i)=x((i+n) \text{ modulo } (2^{18}-1))+y(i) \text{ modulo } 2,\ i=0, \ldots , 2^{18}-2.$$

These binary sequences are converted to real valued sequences $Z_n$ by the following transformation:

$$Z_n(i)=+1 \text{ if } z_n(i)=0 \text{ for } i=0, \ldots , 2^{18}-2.$$

$$Z_n(i)=-1 \text{ if } z_n(i)=1 \text{ for } i=0, \ldots , 2^{18}-2.$$

Finally, the n:th complex scrambling code sequence $S_{dl,n}$ is defined as follows:

$$S_{dl,n}(i)=Z_n(i)+jZ_n((i+131072) \text{ modulo } (2^{18}-1)),\ i=0, \ldots , 38399.$$

In operation, a cellular mobile phone which is located within a cell served by a base station, identifies the scrambling code number of this base station during initialization of the phone. This process, which is well known by one skilled in the art, is called "initial cell search". After this initial process, the phone knows the scrambling code number of its own base station.

The phone then decodes an information stream from the base station containing the information about the adjacent cells. This information contains timing information and the used scrambling code number of the base stations corresponding to the adjacent cells. This code number permits generation of the corresponding scrambling codes. If the mobile phone has to connect to an adjacent cell it uses this scrambling code information to generate the necessary scrambling code for the corresponding new base station.

Turning now again to FIG. 3, the time aligning and descrambling unit DSU comprises also a second register RG2 connected to the inputs and outputs of the second delay elements DE2$A_i$. The second register is clocked with a second register clock signal CLK20 having a period of Tc. In other words, the clock rate of signal CLK2 is the chip rate. Of course, when the DSU unit is provided with several second delay chains DCH2A and DCH2B, all the outputs of all the delay chains are connected to the inputs of the second register RG2.

The outputs of the second register RG2 are connected to the input of a second multiplexer MUX2 successively controlled by second control signals CTR2 delivered by the control means CM. By analogy with the first control signals CTR1, the control means delivers the successive second control signals CTR2 at a frequency of N/Tc. In other words, the switching rate of multiplexer MUX2 is also the chip rate divided by N.

The two outputs of the two multiplexers MUX1 and MUX2 are connected to the two inputs of the complex multiplier MTM. The control means CM, which generate and deliver all the several clock and control signals are, for example, implemented by software within a digital signal processor.

In operation, as explained above, the base station transmits the information related to its scrambling code and this information is delivered to the control means to initiate the Gold code sequence generated by the generator SGA accordingly. Further, by using a pilot signal emitted by the base station, the searcher determines all the time delay values $\tau_1$ of the paths of the multipath channel. This time delay values $\tau_1$ are delivered to the control means which control the two multiplexers MUX1, MUX2 to multiply the delayed version of the received signal with the corresponding phase of the corresponding scrambling code. During one chip period, for each path n(n=1 . . . N) to be processed, one multiplication is performed.

Figure 6:
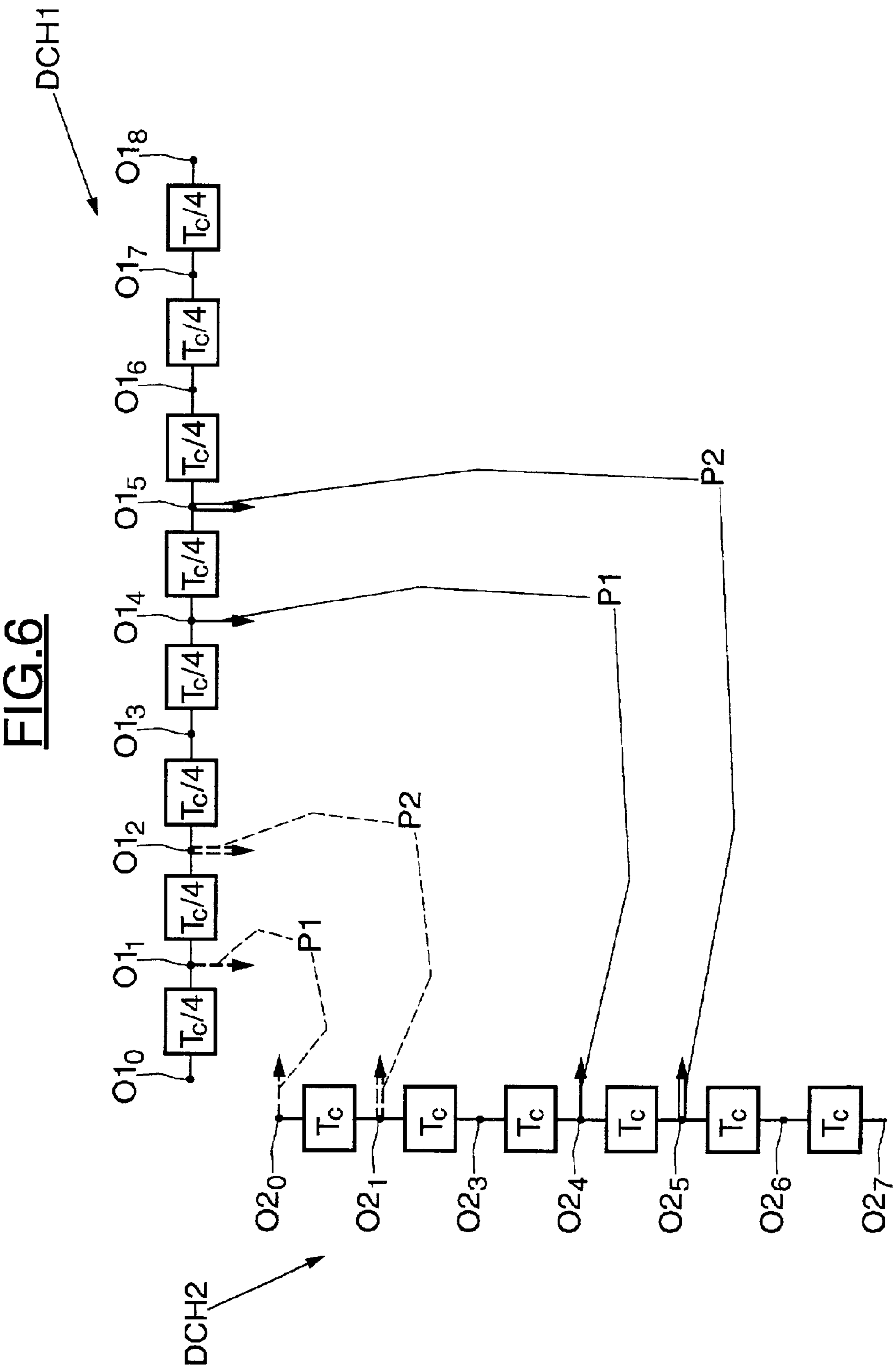
FIG. 6 is a block diagram illustrating an example of operating a time aligning and descrambling unit incorporated in a rake receiver according to the present invention.

An example of control of the two multiplexers MUX1 and MUX2 is illustrated in FIG. 6. In FIG. 6, it is assumed that the path P1 has a time delay value $\tau_i$ 1 equal to Tc/4, whereas the path P2 has a time delay value $\tau_1$ equal to 3Tc/2. The first delay chain DCH1 has 8 first delay elements and accordingly, 9 first outputs O$1_0$–O$1_8$. The second delay chain DCH2 has, for example, 7 second delay elements and 8 second outputs O$2_0$–O$2_7$. Taking into account the time delay values of path P1 and path P2, the control means can select successively first output O$1_1$ and second output O$2_0$ for the path P1, and first output O$1_2$ and second output O$2_1$ for the path P2 as indicated in FIG. 6 with the dotted arrows.

However, another approach includes considering path P1 which has, for example, the smallest time delay value as a reference path. In such a case, the control means can select one specific first output and one specific second output for path P1. Generally, it is preferable to choose as specific outputs, those which are around the middle of the corresponding delay chains, such as, for example, first output O$1_4$ and second output O$2_4$.

In such a case, the other selected outputs associated to the other paths are determined in relation to these specific outputs O$1_4$ and O$2_4$. In the present example, the control means will accordingly select the first output O$1_5$ and the second output O$2_5$ for the path P2.

Of course, such an approach is possible if the difference between the greatest time delay value and the smallest time delay value among all the time delay values of the paths is within the time window of the rake receiver, defined in particular by the length of the second delay chain DCH2.

Such an approach permits the system to easily deal with eventual modification of the time delay values of the path during the transmission. In particular, if some time delay values become smaller than the smallest time delay value associated with path P1 (corresponding to negative time delay values), the control means could thus select, for example, one of the outputs O$1_0$–O$1_3$ or one of the outputs O$2_0$–O$2_3$.

The scrambling code generator is also phase controllable. More precisely, the phase of the scrambling code may be delayed or enhanced by controlling the input clock of the generator. This permits the system to flexibly adapt the receiver time window during the transmission if, for example, one time delay value cannot be obtained by selecting one of the second outputs O$2_i$. In such a case, the phase of the generator is delayed or enhanced to adapt again the window of the time delay values with the actual length of the second delay chain.

The further processing of the descrambled paths is done by demultiplexing the multiplication results for each path into the N fingers of the rake receiver. For achieving this result, the output module of the time-aligning and descrambling unit comprises (FIG. 3) a demultiplexer DMUX1 controlled by a demultiplexer control signal DCTR at a frequency of N/Tc. In other words, the switching rate of the demultiplexer is again the chip rate divided by N.

The processing means of the rake receiver further comprises a despreading and combining unit DPRCU connected to the output module of the time aligning and descrambling unit. The despreading and combining unit DPRCU comprises a storage means MM, for example, a register or memory, for storing the orthogonal code (OVSF code) of the phone. Supplementary multiplication means SMTM are also provided and connected to the main multiplication means MTM through the demultiplexer DMUX1 and another multiplexer MUX3. This multiplexer MUX3 is controlled by a control signal CTR3 at the frequency of N/Tc, i.e., with a switching rate equal to the chip rate divided by N.

With such a switching rate, the supplementary multiplication means SMTM comprises only one complex multiplier for despreading the different signals by a multiplication with the OVSF code. The despreading and combining unit DPRCU comprises also a conventional integration and dump (reset) and combining module IRCU, the structure and the operation of which is well known by one skilled in the art. Of course, such an IRCU module comprises at its head a demultiplexer (not shown). The IRCU module performs, for each path (finger) and successively, an integration to transform the chips into symbols. However, these symbols are not coherent since they are delivered with a phase distortion.

The channel estimation unit CHES extracts the pilot channel or the pilot symbol for each path (finger) F1–FN out of the descrambled data sequence delivered by the demultiplexer DMUX1, and calculates the amplitude and the phase (impulse response) of the channel distortion for each path. This information is then used by the combining means of the IRCU module for the combining process of the different paths.

Figure 7:
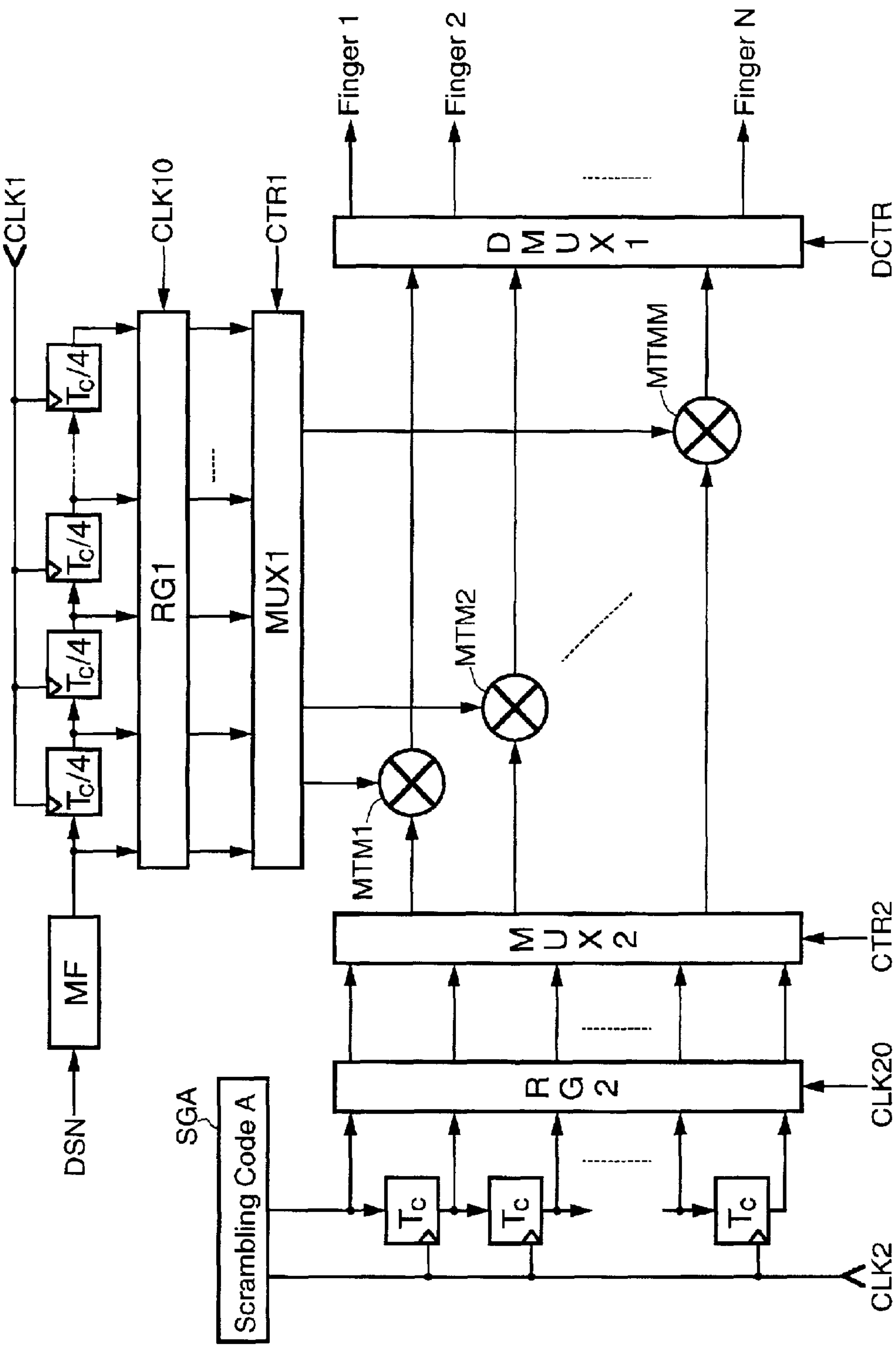
FIG. 7 is a block diagram illustrating another embodiment of the internal structure of the rake receiver according to the present invention.

For lower speed requirements for the main multiplication means MTM, several multipliers can be implemented in parallel to descramble the several . sequences. Such an embodiment of the invention is illustrated in FIG. 7, in which M multipliers MTM1–MTMM are shown.

In such an embodiment, the first control signals and second control signals CTR1 and CTR2, as well as the control signal DCTR controlling the demultiplexer DMUX1, are successively delivered by the control means at a frequency of N/MTc. In other words, the switching rate of this multiplexer and demultiplexer is reduced to M times the chip rate divided by N.

By analogy, whereas in the embodiment illustrated in FIG. 3, the despreading operation with the OVSF code is done sequentially for each path (finger) by multiplexing the N data sequences to one multiplication unit, parallel approaches are possible to reduce the speed requirements for the supplementary multiplication unit SMTM.

While the above description contains certain specifications, this should not be construed as limitations on the scope of the invention, but rather as an example of one preferred embodiment and application thereof. It will be apparent to those skilled in the art that various modifications can be made to the invention without departing from the scope or spirit of the invention, and it is intended that the present invention covers modifications and variations of the rake receiver provided they come in the scope of the appended claims and their equivalences.

For example, in addition to the normal descrambling operation, it is possible to use the same structure for tracking measurements or for search operations. In other words, the architecture of the rake receiver described above can be used for tracking operations or for search operations (e.g., cell search in UTRA FDD, search operation in IS95 or CDMA 2000) by controlling the multiplexing and demultiplexing unit accordingly. The rake receiver according to the invention may also be incorporated in any digital information receiving device for a CDMA system, such as a base sation, for example.

What is claimed is:

1. A digital N-finger rake receiver for a code-division multiple access (CDMA) system comprising:

input means for receiving a digital scrambled and spread signal containing chips having a duration Tc, oversampled with an oversampling factor Ns, and including delayed versions of at least one initial signal scrambled with at least one scrambling code, spread with at least one orthogonal code and transmitted by at least one emitter on a multipath transmission channel having a predetermined maximum delay spread Ds;

estimation means connected to said input means for estimating a number of paths of the multipath transmission channel and respective time delay values associated therewith; and processing means for time aligning and descrambling, despreading, and combining the delayed versions of the at least one initial signal for delivering a data stream contained therein, said processing means comprising a time aligning and descrambling unit comprising a first delay chain connected to said input means and having N1 first outputs with a delay value between two adjacent first outputs equal to Tc/Ns, and with N1 equal to at least Ns+1, at least one phase controllable scrambling code generator for generating at least one phase scrambling code of the at least one initial signal, at least one second delay chain connected to an output of said at least one phase controllable scrambling code generator, and having 1+Ds/Tc second outputs with a delay value between two adjacent second outputs equal to Tc, first controllable selection means for selecting, for each path, one of the first outputs based upon a first control signal, second controllable selection means for selecting, for each path, one of the second outputs based upon a second control signal, and multiplication means for multiplying, for each path, a first signal at a selected first output with a second signal at a selected second output, and control means for delivering the first and second control signals for each path based upon the respective time delay value of the path being considered.

2. A digital N-finger rake receiver according to claim 1, wherein N1 is equal to 2Ns+1.

3. A digital N-finger rake receiver according to claim 1, wherein a path associated with a smallest time delay value is a reference path; and wherein said control means determines a difference between a largest time delay value and the smallest time delay value among all the time delay values of the paths, and said control means selects for the reference path one specific first output of said first delay chain and one specific second output of said at least one second delay chain based upon the difference, with the other selected first and second outputs associated to the other paths being determined based upon the specific first and second outputs.

4. A digital N-finger rake receiver according to claim 1, wherein said first delay chain comprises N1−1 first delay elements, with each delay element having a delay value of Tc/Ns and being clocked by a first clock signal having a period of Tc/Ns; and wherein each delay chain of said at least one second delay chain comprises Ds/Tc second delay elements, with each delay element having a delay value of Tc and being clocked by a second clock signal having a period of Tc.

5. A digital N-finger rake receiver according to claim 1, wherein said control means successively delivers the first and second control signals associated to the corresponding paths at a frequency of N/Tc; and wherein said multiplication means comprises a multiplier.

6. A digital N-finger rake receiver according to claim 5, wherein said first controllable selection means comprises:

a first register connected to the first outputs of said first delay chain and clocked with a first register clock signal having a period of Tc, and a first multiplexer connected between said first register and a first input of said multiplier, said first multiplexer being controlled by the first control signals; and wherein said second controllable selection means comprises:

a second register connected to the second outputs of said at least one second delay chain and clocked with a second register clock signal having a period of Tc, and a second multiplexer connected between said second register and a second input of said multiplier, said second multiplexer being controlled by the second control signal.

7. A digital N-finger rake receiver according to claim 6, further comprising a demultiplexer connected to an output of said multiplier, said demultiplexer having N outputs and is controlled by a demultiplexer control signal at the frequency of N Tc.

8. A digital N-finger rake receiver according to claim 1, wherein said control means successively delivers the first and second control signals associated to the corresponding paths at a frequency of N/MTc; and wherein said multiplication means comprises M parallel multipliers.

9. A digital N-finger rake receiver according to claim 8, wherein said first controllable selection means comprises:

a first register connected to the first outputs of said first delay chain and clocked with a first register clock signal having a period of Tc, and a first multiplexer connected between said first register and a first input of each one of said M parallel multipliers, said first multiplexer being controlled by the first control signal; and wherein said second controllable selection means comprises:

a second register connected to the second outputs of said at least one second delay chain and clocked with a second register clock signal having a period of Tc, and a second multiplexer connected between said second register and a second input of each one of said M parallel multipliers, said second multiplexer being controlled by the second control signal.

10. A digital N-finger rake receiver according to claim 9, further comprising a demultiplexer connected to an output of each one of said M parallel multipliers, said demultiplexer having N outputs and is controlled by a demultiplexer control signal at the frequency of N/MTc.

11. A digital N-finger rake receiver according to claim 1, wherein said at least one phase controllable scrambling code generator comprises a plurality of different phase controllable scrambling code generators; and wherein said at least one second delay chain comprises a plurality of different second delay chains respectively receiving different scrambling codes, each second delay chain having 1+Ds/Tc second outputs with a delay value between two adjacent second outputs equal to Tc.

12. A digital N-finger rake receiver according to claim 1, wherein said estimation means estimates an impulse response of each path.

13. A digital N-finger rake receiver according to claim 1, wherein said processing means further comprises a despreading and combining unit connected to said multiplication means and to said estimation means, said despreading and combining unit comprising:

storage means for storing the orthogonal code; and supplementary multiplication means connected to said multiplication means for multiplying signals delivered therefrom with the orthogonal code.

14. A rake receiver or a code-division multiple access (CDMA) system comprising:

an input stage for receiving a digital scrambled and spread signal containing chips from a multipath transmission channel;

an estimation circuit connected to said input stage for estimating a number of paths of the multipath transmission channel;

a time aligning and descrambling unit connected to said input stage and comprising a first delay chain connected to said input stage and having a plurality of first outputs, at least one phase controllable scrambling code generator for generating a phase scrambling code of at least one initial signal, at least one second delay chain connected to an output of said at least one phase controllable scrambling code generator and having a plurality of second outputs, a first controllable selector for selecting, for each path, one of the first outputs of said first delay chain based upon a first control signal, a second controllable selector for selecting, for each path, one of the second outputs of said at least one second delay chain based upon a second control signal, and at least one multiplier connected to said first and second controllable selectors for multiplying, for each path, a signal at a selected first output of said first delay chain with a signal at a selected second output of said at least one second delay chain.

15. A rake receiver according to claim 14, further comprising a control circuit or delivering the first and second control signals to each path based upon a respective time delay value of the path being considered.

16. A rake receiver according to claim 15, wherein a path associated with a smallest time delay value is a reference path; and wherein said control circuit determines a difference between a largest time delay value and the smallest time delay value among all the time delay values of the paths, and said control circuit selects for the reference path one specific first output of said first delay chain and one specific second output of said at least one second delay chain based upon the difference, with the other selected first and second outputs associated to the other paths being determined based upon the specific outputs.

17. A rake receiver according to claim 14, wherein said first delay chain comprises a plurality of first delay elements, with each delay element having a delay value and being clocked by a first lock signal; and wherein each delay chain of said at least one second delay chain comprises a plurality of second delay elements, with each delay element having a delay value and being clocked by a second clock signal.

18. A rake receiver according to claim 14, wherein said at least one multiplier comprises a single multiplier; and wherein said first controllable selector comprises:

a first register connected to the plurality of first outputs of said first delay chain and clocked with a first register clock signal, and a first multiplexer connected between said first register and a first input of said single multiplier, said first multiplexer being controlled by the first control signal; and wherein said second controllable selector comprises a second register connected to the plurality of second outputs of said at least one second delay chain and clocked with a second register clock signal, and a second multiplexer connected between said second register and a second input of said single multiplier, said second multiplexer being controlled by the second control signal.

19. A rake receiver according to claim 14, wherein said at least one multiplier comprises M parallel multipliers; and wherein said first controllable selector comprises:

a first register connected to the plurality of first outputs of said first delay chain and clocked with a first register clock signal, and a first multiplexer connected between said first register and a first input of each one of said M parallel multipliers, said first multiplexer being controlled by the first control signal; and wherein said second controllable selector comprises:

a second register connected to the plurality of second outputs of said at least one second delay chain and clocked with a second register clock signal, and a second multiplexer connected between said second register and a second input of each one of said M parallel multipliers, said second multiplexer being controlled by the second control signal.

20. A rake receiver according to claim 14, wherein said at least one phase controllable scrambling code generator comprises a plurality of different phase controllable scrambling code generators; and wherein said at least one second delay chain comprises a plurality of different second delay chains respectively receiving different scrambling codes.

21. A rake receiver according to claim 14, further comprising a despreading and combining unit connected to said at least one multiplier and to said estimation circuit, said despreading and combining unit comprising:

a memory for storing an orthogonal code; and a supplemental multiplier connected to said at least one multiplier for multiplying signals delivered therefrom with the orthogonal code.

22. A cellular mobile phone comprising:

a front end for receiving a digital scrambled and spread signal containing chips having a duration Tc, oversampled with an oversampling factor Ns, and including delayed versions of at least one initial signal scrambled with at least one scrambling code, spread with at least one orthogonal code and transmitted by at least one emitter on a multipath transmission channel having a predetermined maximum delay spread Ds; and a processing stage connected to said front end stage and comprising an estimation circuit connected to said front end stage for estimating a number of paths of the multipath transmission channel and respective time delay values associated therewith; and a time aligning and descrambling unit connected to said front end for delivering data contained in the at least one initial signal and comprising a first delay chain connected to said front end and having N1 first outputs with a delay value between two adjacent first outputs equal to Tc/Ns, and N1 is equal to at least Ns+1, at least one phase controllable scrambling code generator for generating at least one scrambling code of the at least one initial signal, at least one second delay chain connected to an output of said at least one phase controllable scrambling code generator, and having 1+Ds/Tc second outputs with delay value between two adjacent second outputs equal to Tc, a first controllable selector or selecting, for each path, one of the first outputs based upon a first control signal, a second controllable selector for selecting, for each path, one of the second outputs based upon a second control signal, and at least one multiplier for multiplying, for each path, a first signal at a selected first output with a second signal at a selected second output, and a control circuit for delivering the first and second control signals for each path based upon the respective time delay value of the path being considered.

23. A cellular mobile phone according to claim 22, wherein N1 is equal to 2Ns+1.

24. A cellular mobile phone according to claim 22, wherein a path associated with a smallest time delay value is a reference path; and wherein said control circuit determines a difference between a largest time delay value and the smallest time delay value among all the time delay values of the paths, and said control circuit selects for the reference path one specific first output of said first delay chain and one specific second output of said at least one second delay chain based upon the difference, with the other selected first and second outputs associated to the other paths being determined based upon the specific first and second outputs.

25. A cellular mobile phone according to claim 22, wherein said first delay chain comprises N1−1 first delay elements, with each delay element having a delay value of Tc/Ns and being clocked by a first clock signal having a period of Tc/Ns; and wherein each delay chain of said at least one second delay chain comprises Ds/Tc second delay elements, with each delay element having a delay value of Tc and being clocked by a second clock signal having a period of Tc.

26. A cellular mobile phone according to claim 22, wherein said control circuit successively delivers the first and second control signals associated to the corresponding paths at a frequency of N/Tc, and wherein said at least one multiplier comprises a single multiplier.

27. A cellular mobile phone according to claim 26, wherein said first controllable selector comprises a first register connected to the first outputs of said first delay chain and clocked with a first register clock signal having a period of Tc, and a first multiplexer connected between said first register and a first input of said single multiplier, said first multiplexer being controlled by the first control signal; and wherein said second controllable selector comprises a second register connected to the second outputs of said at least one second delay chain and clocked with a second register clock signal having a period of Tc, and a second multiplexer connected between said second register and a second input of said single, said second multiplexer being controlled by the second control signal.

28. A cellular mobile phone according to claim 27, further comprising a demultiplexer connected to an output of said at least one multiplier, said demultiplexer having N outputs and is controlled by a demultiplexer control signal at the frequency of N/Tc.

29. A cellular mobile phone according to claim 22, wherein said control circuit successively delivers the first and second control signals associated to the corresponding paths at a frequency of N/MTc; and wherein said at least one multiplier comprises M parallel multipliers.

30. A cellular mobile phone according to claim 29, wherein said first controllable selector comprises a first register connected to the first outputs of said first delay chain and clocked with a first register clock signal having a period of Tc, and a first multiplexer connected between said first register and a first input of each one of said M parallel multipliers, said first multiplexer being controlled by the first control signal; and wherein said second controllable selector comprises a second register connected to the second outputs of said at least one second delay chain and clocked with a second register clock signal having a period of Tc, and a second multiplexer connected between said second register and a second input of each one of said M parallel multipliers, said second multiplexer being controlled by the second control signal.

31. A cellular mobile phone according to claim 30, further comprising a demultiplexer connected to an output of each one of said M parallel multipliers, said demultiplexer having N outputs and is controlled by a demultiplexer control signal at the frequency of N/MTc.

32. A cellular mobile phone according to claim 22, wherein said at least one phase controllable scrambling code generator comprises a plurality of different phase controllable scrambling code generators; and wherein said at least one second delay chain comprises a plurality of different second delay chains respectively receiving different scrambling codes, each second delay chain having 1+Ds/Tc second outputs and a delay value between two adjacent second outputs equal to Tc.

33. A cellular mobile phone according to according to claim 22, wherein said estimation circuit estimates an impulse response of each path.

34. A cellular mobile phone according to claim 22, wherein said processing stage further comprises a despreading and combining circuit connected to said at least one multiplier and to said estimation circuit, said despreading and combining circuit comprising:

a memory for storing the orthogonal code; and a supplemental multiplier connected to said at least one multiplier for multiplying signals delivered therefrom with the orthogonal code.

35. A method for processing a digital signal for a code-division multiple access (CDMA) system, with the digital scrambled and spread signal containing chips from a multipath transmission channel, the method comprising:

estimating a number of paths of the multipath transmission channel and respective time delay values associated therewith;

applying the digital signal to a first delay chain having a plurality of first outputs, generating at least one scrambling code of at least one initial signal;

applying the at least one scrambling code to at least one second delay chain having a plurality of second outputs;

selecting, for each path, one of the plurality of first outputs of the first delay chain based upon a first control signal;

selecting, for each path, one of the plurality of second outputs of said at least one second delay chain based upon a second control signal;

multiplying, for each path, a signal at selected first output of the first delay chain with a signal at a selected second output of the at least one second delay chain; and delivering the first and second control signals for each path based upon the respective time delay value of the path being considered.

36. A method according to claim 35, wherein a path associated with a smallest time delay value is a reference path; and the method further comprising:

determining a difference between a largest time delay value and the smallest time delay value among all the time delay values of the paths; and selecting as the reference path one specific first output of the first delay chain and one specific second output of the at least one second delay chain based upon the difference, with the other selected first and second outputs of the first and second delay chains associated to the other paths being determined based upon the specific outputs.

37. A method according to claim 35, wherein the first delay chain comprises plurality of first delay elements, with each delay element having a delay value and being clocked by a first clock signal; and wherein the at least one second delay chain comprises a plurality of second delay elements, with each delay element having a delay value and being clocked by a second clock signal.

38. A method according to claim 35, wherein delivering the first and second control signals comprises successively delivering the first and second control signals associated to the corresponding paths.

39. A method according to claim 35, wherein generating the at least one scrambling code comprises generating a plurality of different scrambling codes; and wherein the at least one second delay chain comprises a plurality of different second delay chains respectively receiving different scrambling codes.

* * * * *

UNITED STATES PATENT AND TRADEMARK OFFICE

CERTIFICATE OF CORRECTION

PATENT NO. : 6,947,470 B2
APPLICATION NO. : 09/907086
DATED : September 20, 2005
INVENTOR(S) : Friedbert Berens It is certified that error appears in the above-identified patent and that said Letters Patent is hereby corrected as shown below:

| | |
|---|---|
| Column 7, Line 14 and Line 16 | Delete: "$DE1_1$" Insert: -- $DE1_i$ -- |
| Column 8, Line 3 | Delete: "$DE2A_1$" Insert: -- $DE2A_i$ -- |
| Column 9, Lines 43, 45 and 54 | Delete: "$\tau_1$" Insert: --$\tau_i$-- |
| Column 11, Line 8 | Delete: "several . sequences." Insert: --several sequences. -- |
| Column 14, Line 36 | Delete: "lock" Insert: --clock-- |
| Column 17, Line 13 | Delete: "according to according to" Insert: -- according to -- |

Signed and Sealed this

Fourth Day of September, 2007

JON W. DUDAS
*Director of the United States Patent and Trademark Office*